United States Patent
Tian

(10) Patent No.: US 11,835,369 B2
(45) Date of Patent: Dec. 5, 2023

(54) 3D PRINTER DETECTION DEVICE HAVING MAGNET AND HALL SENSOR

(71) Applicant: SHENZHEN TUOZHU TECHNOLOGY CO., LTD., Guangdong (CN)

(72) Inventor: Kaiwang Tian, Guangdong (CN)

(73) Assignee: SHENZHEN TUOZHU TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 17/961,305

(22) Filed: Oct. 6, 2022

(65) Prior Publication Data

US 2023/0129558 A1    Apr. 27, 2023

(51) Int. Cl.
*B33Y 30/00*      (2015.01)
*G01D 5/14*       (2006.01)
*B29C 64/386*     (2017.01)
*B33Y 50/00*      (2015.01)

(52) U.S. Cl.
CPC ........... *G01D 5/145* (2013.01); *B29C 64/386* (2017.08); *B33Y 30/00* (2014.12); *B33Y 50/00* (2014.12)

(58) Field of Classification Search
None
See application file for complete search history.

(56) References Cited

U.S. PATENT DOCUMENTS

| | | | |
|---|---|---|---|
| 2007/0228592 A1* | 10/2007 | Dunn | B29C 64/106 264/113 |
| 2018/0126656 A1* | 5/2018 | Ladanyi | B29C 64/343 |
| 2020/0031048 A1* | 1/2020 | Stubbs | B29C 64/205 |
| 2022/0088875 A1* | 3/2022 | You | B33Y 70/00 |
| 2022/0388245 A1* | 12/2022 | Van Lent | B33Y 50/00 |

\* cited by examiner

*Primary Examiner* — Yung-Sheng M Tsui
(74) *Attorney, Agent, or Firm* — Enable IP, P.C.

(57) ABSTRACT

A detection device for a 3D printer and a 3D printer are provided. The detection device includes: a housing defining at least one feed port, a discharge port, a feed channel, and a discharge channel, the feed channel and the discharge channel form an internal cavity, and at least one hole in communication with the internal cavity is provided; at least one magnet respectively arranged in a hole, an end of the magnet inserted into the internal cavity is shaped with an end surface, such that when the printing filament is fed to a position of the magnet, the tip of the printing filament presses the end surface, thereby pushing the magnet to move to a predetermined position; and at least one Hall sensor, arranged to cooperate with a corresponding magnet, such that the Hall sensor is triggered when the corresponding magnet moves to the predetermined position.

20 Claims, 3 Drawing Sheets

3D PRINTER DETECTION DEVICE HAVING MAGNET AND HALL SENSOR

CROSS REFERENCE TO RELATED APPLICATIONS

This application claims priority to Chinese Patent Application No. 202122558364.X, filed on Oct. 22, 2021, the contents of which are hereby incorporated by reference in their entirety for all purposes.

TECHNICAL FIELD

The present disclosure relates to the technical field of 3D printing, in particular to a detection device for a 3D printer and a 3D printer.

BACKGROUND

Three-dimension (3D) printing technology, also known as additive manufacturing technology, is a technology that uses digital model files as the basis for constructing objects through layer-by-layer printing by using bondable materials. 3D printing is usually implemented with a 3D printer. The 3D printer, also known as a three-dimensional printer or a stereoscopic printer, is a type of process equipment for rapid prototyping. 3D printers are often used in fields such as mold making and industrial design to manufacture models or parts. A typical 3D printing technology is fused deposition modeling (FDM). The working principle of FDM is as follows: a hot melt nozzle is controlled by a computer and moves in a horizontal plane according to the cross-sectional profile information of a product part. A thermoplastic filament material is fed to the hot melt nozzle by a filament supply mechanism, and a molten material is extruded from the nozzle and deposited on a printing platform. The material is rapidly cooled to form a thin layer of profile. After one layer of cross-sectional molding is completed, the printing platform moves in a vertical direction by a particular distance, and then a next layer of fusing is performed. Such a process is repeated to eventually form a three-dimensional product part. In a printing process, it is usually necessary to detect the position of a tip of a printing filament in a material guide pipe to control the printing process.

The methods described in this section are not necessarily methods that have been previously conceived or employed. It should not be assumed that any of the methods described in this section is considered to be the prior art just because they are included in this section, unless otherwise indicated expressly. Similarly, the problem mentioned in this section should not be considered to be universally recognized in any prior art, unless otherwise indicated expressly.

SUMMARY

Embodiments of the present disclosure provide a detection device for a 3D printer and a 3D printer.

According to an aspect of the present disclosure, a detection device for a 3D printer is provided. The detection device is for disposing in a material guide pipe of the 3D printer to detect a position of a tip of a printing filament in the material guide pipe. The detection device includes: a housing defining at least one feed port, a discharge port, at least one feed channel respectively in communication with the at least one feed port, and a discharge channel communicating the at least one feed channel with the discharge port, the at least one feed channel and the discharge channel form an internal cavity of the housing, and at least one hole in communication with the internal cavity is provided in a wall of the housing; at least one magnet being respectively arranged in the at least one hole, each magnet being movably inserted into the internal cavity along an axial direction of a corresponding hole of the at least one hole, an end of each magnet inserted into the internal cavity is shaped with an end surface at an angle relative to a feeding direction, such that when the printing filament is fed to a position of the magnet along the feeding direction in the internal cavity, the tip of the printing filament directly presses the end surface of the end, thereby pushing the magnet to move to a predetermined position in the corresponding hole; and at least one Hall sensor, each Hall sensor being arranged to cooperate with a corresponding magnet of the at least one magnet, such that the Hall sensor is triggered when the corresponding magnet moves to the predetermined position.

According to another aspect of the present disclosure, a 3D printer is provided. The 3D printer includes a material guide pipe and a detection device for disposing in the material guide pipe to detect a position of a tip of a printing filament in the material guide pipe. The detection device includes: a housing defining at least one feed port, a discharge port, at least one feed channel respectively in communication with the at least one feed port, and a discharge channel communicating the at least one feed channel with the discharge port, the at least one feed channel and the discharge channel form an internal cavity of the housing, and at least one hole in communication with the internal cavity is provided in a wall of the housing; at least one magnet respectively arranged in the at least one hole, each magnet being movably inserted into the internal cavity along an axial direction of a corresponding hole of the at least one hole, an end of each magnet inserted into the internal cavity is shaped with an end surface at an angle relative to a feeding direction such that when the printing filament is fed to a position of the magnet along the feeding direction in the internal cavity, the tip of the printing filament directly presses the end surface of the end, thereby pushing the magnet to move to a predetermined position in the corresponding hole; and at least one Hall sensor, each Hall sensor being arranged to cooperate with a corresponding magnet of the at least one magnet such that the Hall sensor is triggered when the corresponding magnet moves to the predetermined position.

The additional aspects and advantages of the present disclosure are partially provided in the following description and partially become obvious from the following description or understood through the practice of the present disclosure.

BRIEF DESCRIPTION OF THE DRAWINGS

The foregoing and/or additional aspects and advantages of the present disclosure will be apparent and easily comprehensible from the description of the embodiments with reference to the accompanying drawings.

In the accompanying drawings, the same reference numerals denote the same or similar parts or elements throughout a plurality of drawings unless otherwise specified. These drawings are not necessarily drawn to scale. It should be understood that these drawings depict only some embodiments according to the present disclosure herein and are not to be construed as limiting the scope of the present application.

DETAILED DESCRIPTION

Only some example embodiments are briefly described below. As can be appreciated by those skilled in the art, the described embodiments can be modified in various ways without departing from the spirit or scope of the present application. Accordingly, the drawings and the description are considered as illustrative in nature, and not as restrictive.

As discussed above, in a printing process, it is usually necessary to detect the position of a tip of a printing filament in a material guide pipe to facilitate the control of the printing process. In some related technologies, a travel switch may be used to detect the position of the tip of the printing filament in the material guide pipe. In some related technologies, a photoelectric sensor may be used to detect the position of the tip of the printing filament in the material guide pipe. However, in the printing process, the filament keeps rubbing against the pipe and an extrusion wheel of a material supply mechanism may extrude the filament, resulting in the generation of dust from the filament. The generated dust may adhere to the filament. When the filament touches the travel switch or the photoelectric sensor, the generated dust may adhere to and accumulate on the travel switch or photoelectric sensor. If the dust enters the travel switch, a signal error or a failure may occur, resulting in reduced reliability of detection. If the dust accumulates on or near the photoelectric sensor, a signal error may occur in the photoelectric sensor, resulting in reduced reliability of detection.

The embodiments of the present disclosure are described below in detail with reference to the accompanying drawings.

Figure 1:
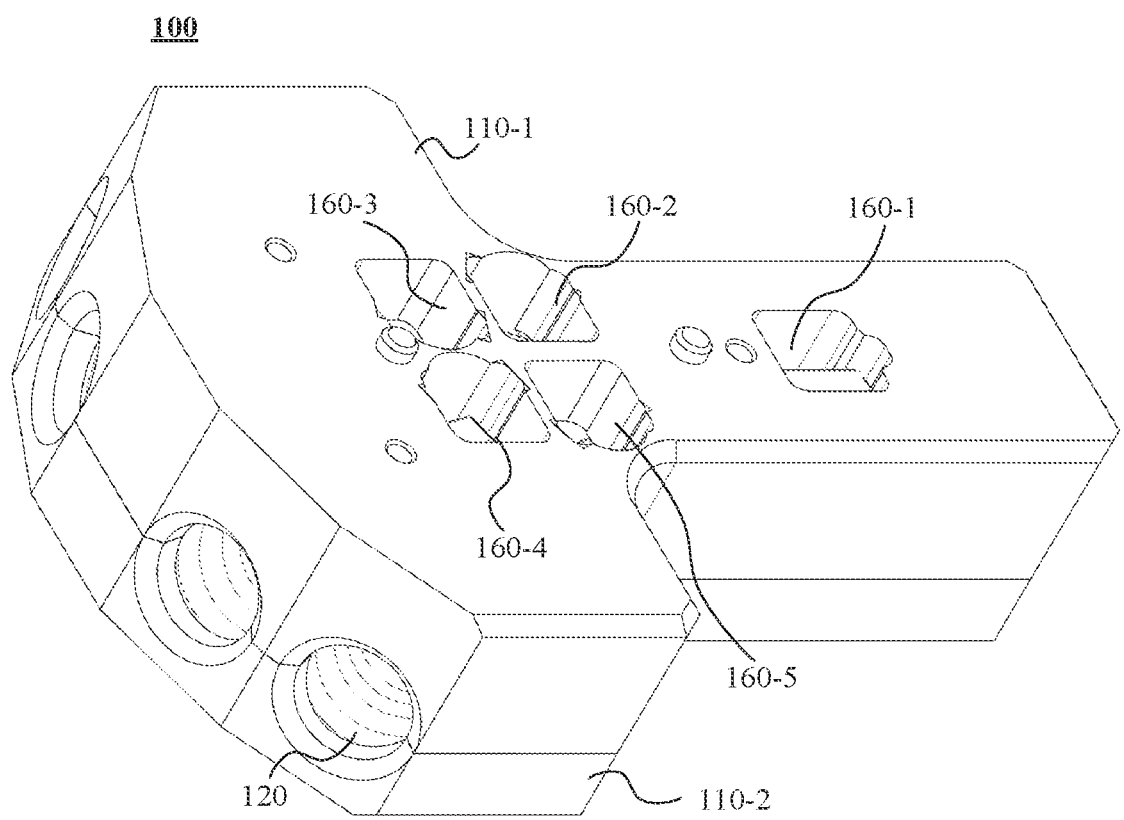
FIG. 1 is a schematic diagram of a detection device for a 3D printer according to an embodiment of the present disclosure.
Figure 2:
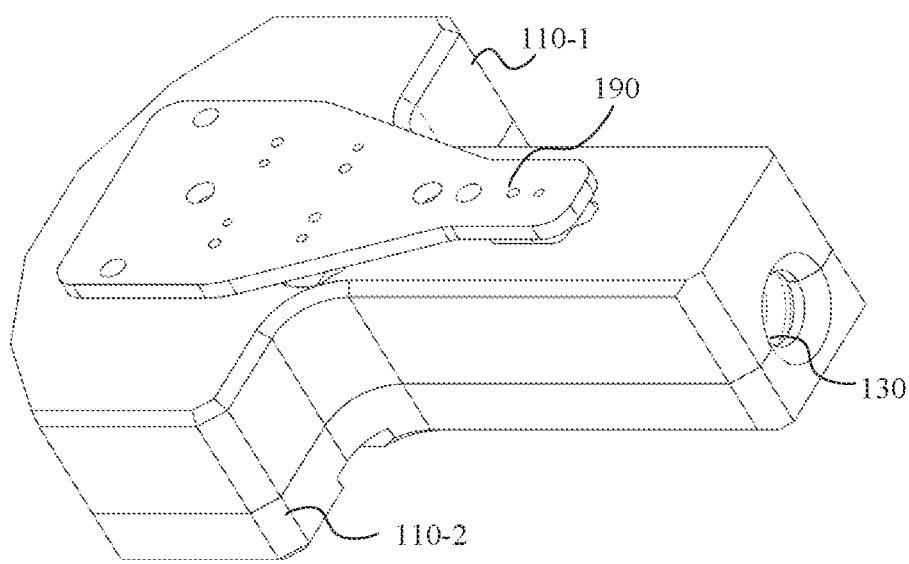
FIG. 2 is a schematic diagram of a detection device for a 3D printer according to an embodiment of the present disclosure.
Figure 3:
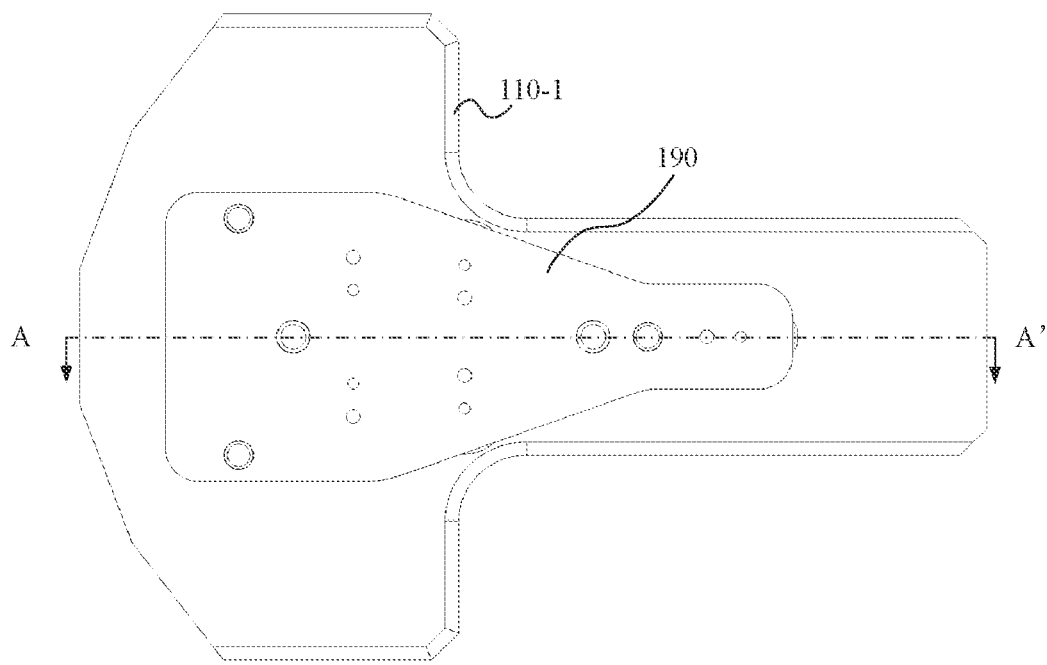
FIG. 3 is a top view of a detection device for a 3D printer according to an embodiment of the present disclosure.
Figure 4:
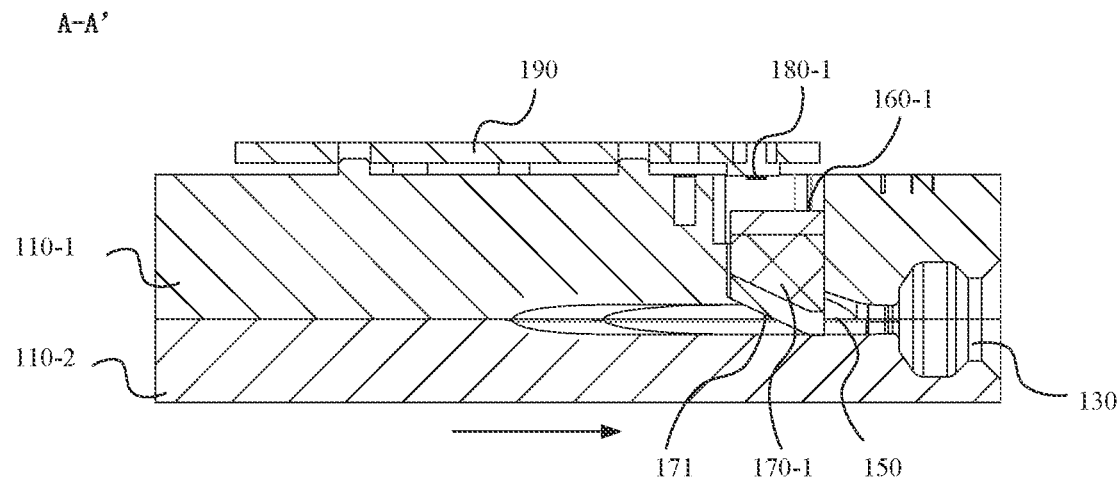
FIG. 4 is a cross-sectional view of a detection device for a 3D printer according to an embodiment of the present disclosure along a cross-section A-A' in FIG. 3.
Figure 5:
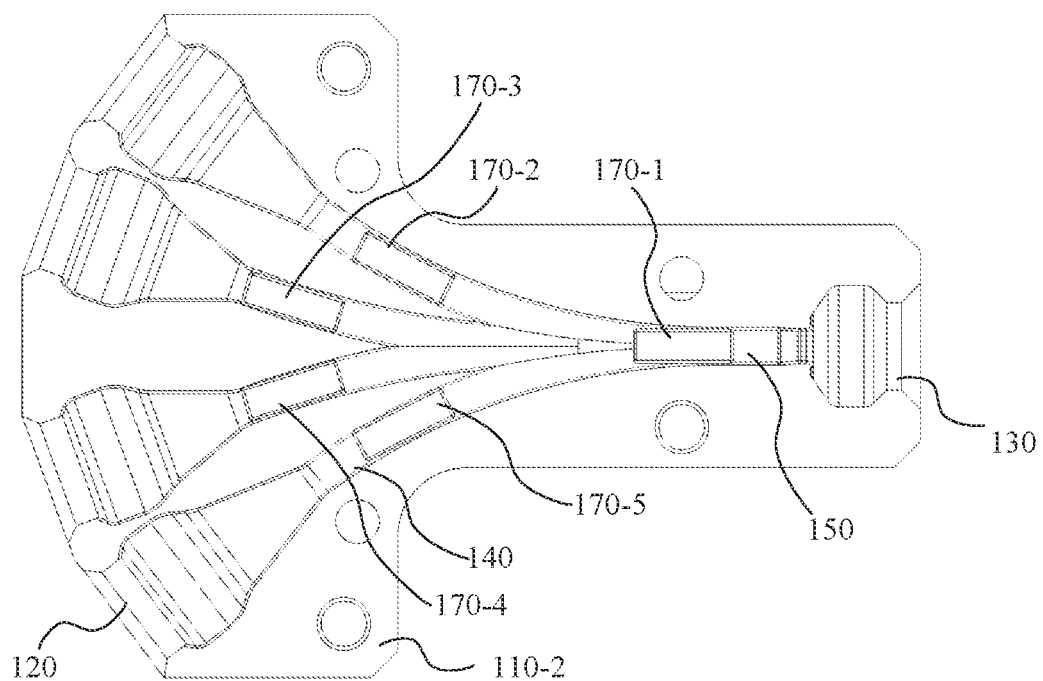
FIG. 5 is a top view of a part of a detection device for a 3D printer according to an embodiment of the present disclosure.

FIG. 1 and FIG. 2 are schematic diagrams of a detection device 100 for a 3D printer according to an embodiment of the present disclosure. FIG. 3 is a top view of a detection device 100 for a 3D printer according to an embodiment of the present disclosure. FIG. 4 is a cross-sectional view of a detection device 100 for a 3D printer according to an embodiment of the present disclosure along a cross-section A-A' in FIG. 3. FIG. 5 is a top view of a part of a detection device 100 for a 3D printer according to an embodiment of the present disclosure.

Referring to FIG. 1 to FIG. 5, an embodiment of the present disclosure provides a detection device 100 for a 3D printer. The detection device 100 is disposed in a material guide pipe of the 3D printer to detect a position of a tip of a printing filament in the material guide pipe.

The detection device 100 comprises a housing 110-1, 110-2. The housing 110-1, 110-2 defines at least one feed port 120, a discharge port 130, at least one feed channel 140 respectively in communication with the at least one feed port 120, and a discharge channel 150 communicating the at least one feed channel 140 with the discharge port 130. The at least one feed channel 140 and the discharge channel 150 form an internal cavity of the housing 110-1, 110-2, and at least one hole 160-1, 160-2, 160-3, 160-4, 160-5 in communication with the internal cavity is provided in a wall of the housing 110-1, 110-2. Each of the feed port 120 and the discharge port 130 may be connected to any section of the material guide pipe of the 3D printer and is used for detecting the position of the tip of the printing filament in the material guide pipe.

The detection device 100 further comprises five magnets 170-1, 170-2, 170-3, 170-4, 170-5. The five magnets 170-1, 170-2, 170-3, 170-4, 170-5 are respectively arranged in five holes 160-1, 160-2, 160-3, 160-4, 160-5. Each magnet is movably inserted into the internal cavity along an axial direction of a corresponding hole. As can be seen from the cross-sectional view shown in FIG. 4, the magnet 170-1 is arranged in the hole 160-1, and the magnet 170-1 is movably inserted into the internal cavity along an axial direction of the hole 160-1.

The end of each magnet inserted into the internal cavity is shaped with an end surface at an angle relative to a feeding direction, such that when the printing filament is fed to the position of the magnet along the feeding direction in the internal cavity, the tip of the printing filament directly presses the end surface of the end, thereby pushing the magnet to move to the predetermined position in the corresponding hole. As can be seen from the cross-sectional view shown in FIG. 4, an end of the magnet 170-1 inserted into the internal cavity is shaped with an end surface 171 at an angle relative to a feeding direction (the direction indicated by an arrow in the figure). When a printing filament is fed to the position of the magnet 170-1 along the feeding direction (the direction indicated by the arrow in the figure) in the internal cavity, a tip of the printing filament directly presses the end surface 171 of the end, such that the magnet 170-1 may be pushed to move to the predetermined position (for example, a position of moving upward by 5 millimeters) in the hole 160-1.

The detection device 100 further comprises at least one Hall sensor. Each Hall sensor being arranged to cooperate with a corresponding magnet of the at least one magnet, such that the Hall sensor is triggered when the corresponding magnet moves to the predetermined position. As can be seen from the cross-sectional view shown in FIG. 4, the Hall sensor 180-1 is arranged to cooperate with the magnet 170-1. When the magnet 170-1 moves to the predetermined position (for example, a position of moving upward by 5 millimeters), the Hall sensor 180-1 is triggered.

The filament is not in contact with the Hall sensor. Instead, the magnet is triggered to move, and the magnet triggers the Hall sensor through Hall effect. Therefore, dust generated from the filament does not adhere to or accumulate on the Hall sensor, such that the dust is prevented from adversely affecting the detection of the Hall sensor. Therefore, the accuracy and reliability of detecting the position of the tip of the printing filament in the material guide pipe can be improved.

It should be understood that although four feed ports 120 and four feed channels 140 are shown in the figure, the detection device 100 may comprise one, two, three, five or more feed ports 120. Correspondingly, the detection device 100 may comprise one, two, three, five or more feed channels 140.

It should be further understood that although five magnets (170-1, 170-2, 170-3, 170-4, 170-5) and five holes (160-1, 160-2, 160-3, 160-4, 160-5) are shown in FIG. 1 to FIG. 5, the detection device 100 may comprise one, two, three, four, six or more magnets. Correspondingly, the detection device 100 may comprise one, two, three, four, six or more holes used for arranging corresponding magnets. Correspondingly, the detection device 100 may comprise one, two, three, four, six or more Hall sensors.

In some embodiments, each Hall sensor may be arranged in proximity to the end of the corresponding magnet inserted into the internal cavity, along an axial direction of a hole in which the corresponding magnet is located. For example, the Hall sensor 180-1 may be arranged on the side of the housing 110-2 in FIG. 4.

In some embodiments, each Hall sensor may be arranged in proximity to another end of the corresponding magnet, along an axial direction of a hole in which the corresponding magnet is located. The another end is opposite to an end of the corresponding magnet inserted into the internal cavity. For example, the Hall sensor 180-1 may be arranged on the side of the housing 110-1 in FIG. 4.

In some embodiments, as shown in FIG. 4, the at least one hole 160-1 may be at least one through hole, and the detection device 100 may further comprise a cap body 190. The cap body 190 is detachably connected to an outer surface of the housing (for example, the housing 110-1) and covers the through hole 160-1, and the at least one Hall sensor 180-1 is attached to the cap body 190. Thereby, the magnet 170-1 may be mounted, repaired or replaced through the through hole 160-1. In addition, because the Hall sensor 180-1 is disposed on the cap body 190 and the cap body 190 is detachable, it is also convenient to mount, repair or replace the Hall sensor.

In some embodiments, the axial direction may be a vertical direction, such that when there is no printing filament at a position of the at least one magnet 170-1, 170-2, 170-3, 170-4, 170-5 in the internal cavity, the at least one magnet 170-1, 170-2, 170-3, 170-4, 170-5 is capable of being inserted into the internal cavity under gravity of the at least one magnet.

When a plurality of magnets are arranged in the detection device 100 and relative positions of the plurality of magnets are relatively close, if one magnet (for example, the magnet 170-2 in FIG. 5) is pushed by the filament to move, for example, due to the interaction between a magnetic field generated by the magnet 170-2 and a magnetic field generated by the magnet 170-1, although at this time no filament passes through and moves the magnet 170-1, the magnet 170-1 may still move under the magnetic force. This may cause an incorrect detection result.

Therefore, in some embodiments, the detection device 100 may further comprise at least one stopper (not shown). Each stopper may be arranged at an end of a corresponding hole (for example, the hole 160-1 in FIG. 4) in the at least one hole away from the internal cavity to apply an force to a corresponding magnet (for example, the magnet 170-1 in FIG. 4) of the at least one magnet to stop the corresponding magnet (for example, the magnet 170-1 in FIG. 4) from moving toward the predetermined position. If the magnet 170-1 tends to move upward under the magnetic field generated by the magnet 170-2, because the stopper is disposed, the magnet 170-1 is prevented from moving upward under the force from the stopper, such that the Hall sensor 180-1 is prevented from being triggered and therefore an incorrect detection result is avoided. The magnitude of the force generated by the stopper may be set to block a magnet from such an unexpected movement but allow the magnet to move under the pushing force from a filament.

In some embodiments, each stopper may be a spring. The spring may apply an elastic force to the magnet 170-1, to stop the corresponding magnet 170-1 from moving toward the predetermined position.

In some embodiments, each stopper may be a magnet magnetically repelling the corresponding magnet 170-1. The magnetically repelling magnet may apply a repelling force to prevent the corresponding magnet 170-1 from moving toward the predetermined position.

In some embodiments, the end surface of the end of each magnet inserted into the internal cavity may be a plane (for example, the end surface 171 shown in FIG. 4).

In some embodiments, the end surface of the end of each magnet inserted into the internal cavity may be a paraboloid.

According to another aspect of the present disclosure, a 3D printer is further provided. The 3D printer comprises the detection device 100 according to the above. The detection device 100 may be disposed in a material guide pipe of the 3D printer (for example, the feed port 120 and the discharge port 130 of the detection device 100 are separately connected to the material guide pipe of the 3D printer) to detect a position of a tip of a printing filament in the material guide pipe.

The filament is not in contact with the Hall sensor. Instead, the magnet is triggered to move, and the magnet triggers the Hall sensor through Hall effect. Therefore, dust generated from the filament does not adhere to or accumulate on the Hall sensor, such that the dust is prevented from adversely affecting the detection of the Hall sensor. Therefore, the accuracy and reliability of detecting the position of the tip of the printing filament in the material guide pipe can be improved.

It should be understood that, in this description, the orientations or positional relationships or dimensions denoted by the terms, such as "center". "longitudinal", "transverse", "length", "width", "thickness", "upper", "lower", "front", "rear", "left", "right", "vertical", "horizontal", "top". "bottom", "inner", "outer", "clockwise", "counterclockwise", "axial", "radial" and "circumferential", are the orientations or positional relationships or dimensions shown on the basis of the drawings, and these terms are used merely for ease of description, rather than indicating or implying that the device or element referred to must have particular orientations and be constructed and operated in the particular orientations, and therefore should not be construed as limiting the scope of protection of the present application.

In addition, the terms "first", "second" and "third" are merely for descriptive purposes and should not be construed as indicating or implying relative importance or implicitly indicating the number of technical features indicated. Thus, the features defined with "first", "second" and "third" may explicitly or implicitly comprise one or more features. In the description of the present application, the term "plurality of" means two or more, unless specifically and specifically limited otherwise.

In the present application, unless expressly stated or limited otherwise, the terms such as "mounting", "connection", "connected" and "fixing" should be interpreted broadly, for example, either fixed or detachable connection, or integration; which may be mechanical connection, or electrical connection, or communication; and which may be direct connection or indirect connection by means of an intermediate medium, and may be communication between the interiors of two elements or the interaction relationship of the two elements. For those of ordinary skills in the art, the specific meaning of the terms mentioned above in the present application may be construed according to specific circumstances.

In the present application, unless expressly stated or limited otherwise, the expression of the first feature being "above" or "below" the second feature may comprise the case that the first feature is in direct contact with the second feature, and may also comprise the case that the first and second features are not in direct contact but are contacted via another feature therebetween. Furthermore, the first feature being "over", "above" or "on" the second feature comprises the case that the first feature is directly or obliquely above the second feature, or merely indicates that the first feature is at a higher level than the second feature. The first feature being "below", "under" or "beneath" the second feature comprises the case that the first feature is directly or obliquely below the second feature, or merely indicates that the first feature is at a smaller level than the second feature.

This description provides many different embodiments or examples that can be used to implement the present application. It should be understood that these various embodiments or examples are purely illustrative and are not intended to limit the scope of protection of the present application in any way. On the basis of the disclosure of the description of the present application, those skilled in the art will be able to conceive of various changes or substitutions. Any changes or substitutions shall fall within the scope of protection of the present application. Therefore, the scope of protection of the present application shall be subject to the scope of protection of the claims.

LISTING OF REFERENCE NUMERALS

Detection device 100;
Housing 110-1, 110-2;
Feed port 120;
Discharge port 130;
Feed channel 140;
Discharge channel 150;
Hole 160-1, 160-2, 160-3, 160-4, 160-5;
Magnet 170-1, 170-2, 170-3, 170-4, 170-5;
End surface 171;
Hall sensor 180-1;
Cap body 190; and
Cross-section A-A'.

What is claimed is:

1. A detection device for a 3D printer, the detection device for disposing in a material guide pipe of the 3D printer to detect a position of a tip of a printing filament in the material guide pipe, the detection device comprising:
    a housing defining at least one feed port, a discharge port, at least one feed channel respectively in communication with the at least one feed port, and a discharge channel communicating the at least one feed channel with the discharge port, wherein the at least one feed channel and the discharge channel form an internal cavity of the housing, and at least one hole in communication with the internal cavity is provided in a wall of the housing;
    at least one magnet respectively arranged in the at least one hole, each magnet being movably inserted into the internal cavity along an axial direction of a corresponding hole of the at least one hole, wherein an end of each magnet inserted into the internal cavity is shaped with an end surface at an angle relative to a feeding direction such that when the printing filament is fed to a position of the magnet along the feeding direction in the internal cavity, the tip of the printing filament directly presses the end surface of the end, thereby pushing the magnet to move to a predetermined position in the corresponding hole; and
    at least one Hall sensor, each Hall sensor being arranged to cooperate with a corresponding magnet of the at least one magnet such that the Hall sensor is triggered when the corresponding magnet moves to the predetermined position.

2. The detection device according to claim 1, wherein each Hall sensor is arranged in proximity to an end of the corresponding magnet inserted into the internal cavity.

3. The detection device according to claim 1, wherein each Hall sensor is arranged in proximity to another end of the corresponding magnet, the another end opposite to an end of the corresponding magnet inserted into the internal cavity.

4. The detection device according to claim 1, wherein the at least one hole is at least one through hole, and the detection device further comprises a cap body detachably connected to an outer surface of the housing and covering the at least one through hole, the at least one Hall sensor being attached to the cap body.

5. The detection device according to claim 1, wherein the axial direction is a vertical direction such that when there is no printing filament at a position of the at least one magnet in the internal cavity, the at least one magnet is capable of being inserted into the internal cavity under gravity of the at least one magnet.

6. The detection device according to claim 1, further comprising at least one stopper, each stopper being arranged at an end of a corresponding hole of the at least one hole away from the internal cavity to apply an force to a corresponding magnet of the at least one magnet to stop the corresponding magnet from moving toward the predetermined position.

7. The detection device according to claim 6, wherein each stopper comprises a spring.

8. The detection device according to claim 6, wherein each stopper comprises a magnet magnetically repelling the corresponding magnet.

9. The detection device according to claim 1, wherein the end surface of the end of each magnet inserted into the internal cavity is a plane.

10. The detection device according to claim 1, wherein the end surface of the end of each magnet inserted into the internal cavity is a paraboloid.

11. A 3D printer comprising:
    a material guide pipe; and
    a detection device for disposing in the material guide pipe to detect a position of a tip of a printing filament in the material guide pipe, the detection device comprising:
        a housing defining at least one feed port, a discharge port, at least one feed channel respectively in communication with the at least one feed port, and a discharge channel communicating the at least one feed channel with the discharge port, wherein the at least one feed channel and the discharge channel form an internal cavity of the housing, and at least one hole in communication with the internal cavity is provided in a wall of the housing;
        at least one magnet respectively arranged in the at least one hole, each magnet being movably inserted into the internal cavity along an axial direction of a corresponding hole of the at least one hole, wherein an end of each magnet inserted into the internal cavity is shaped with an end surface at an angle relative to a feeding direction such that when the printing filament is fed to a position of the magnet along the feeding direction in the internal cavity, the tip of the printing filament directly presses the end surface of the end, thereby pushing the magnet to move to a predetermined position in the corresponding hole; and at least one Hall sensor, each Hall sensor being arranged to cooperate with a corresponding magnet of the at least one magnet such that the Hall sensor is triggered when the corresponding magnet moves to the predetermined position.

12. The 3D printer according to claim 11, wherein each Hall sensor is arranged in proximity to an end of the corresponding magnet inserted into the internal cavity.

13. The 3D printer according to claim 11, wherein each Hall sensor is arranged in proximity to another end of the corresponding magnet, the another end opposite to an end of the corresponding magnet inserted into the internal cavity.

14. The 3D printer according to claim 11, wherein the at least one hole is at least one through hole, and the detection device further comprises a cap body detachably connected to an outer surface of the housing and covering the at least one through hole, the at least one Hall sensor being attached to the cap body.

15. The 3D printer according to claim 11, wherein the axial direction is a vertical direction such that when there is no printing filament at a position of the at least one magnet in the internal cavity, the at least one magnet is capable of being inserted into the internal cavity under gravity of the at least one magnet.

16. The 3D printer according to claim 11, further comprising at least one stopper, each stopper being arranged at an end of a corresponding hole of the at least one hole away from the internal cavity to apply an force to a corresponding magnet of the at least one magnet to stop the corresponding magnet from moving toward the predetermined position.

17. The 3D printer according to claim 16, wherein each stopper comprises a spring.

18. The 3D printer according to claim 16, wherein each stopper comprises a magnet magnetically repelling the corresponding magnet.

19. The 3D printer according to claim 11, wherein the end surface of the end of each magnet inserted into the internal cavity is a plane.

20. The 3D printer according to claim 11, wherein the end surface of the end of each magnet inserted into the internal cavity is a paraboloid.

\* \* \* \* \*